United States Patent Office 3,076,768
Patented Feb. 5, 1963

3,076,768
DEFOAMER
Francis J. Boylan, Wilmington, Del., assignor to Hercules Powder Company, Wilmington, Del., a corporation of Delaware
No Drawing. Filed Apr. 5, 1960, Ser. No. 19,990
9 Claims. (Cl. 252—358)

This invention relates to defoaming compositions which are particularly useful for preventing or abating foam in aqueous systems and to a method of preparing same.

Commercial silicone defoamers have proved very effective for preventing and/or abating foam in aqueous systems. Such defoamers, however, are relatively costly and hence add appreciably to the cost of the process and/or product in which they are used.

A principal object of the invention is the provision of a novel, inexpensive defoamer composition formed of readily available cheap materials and having an effectiveness comparable to the more expensive types of defoamers.

The above and other objects of the invention are accomplished by the provision of a defoaming composition comprising from about 80% to about 97% of a water-insoluble, organic liquid selected from the group consisting of kerosene, naphthenic mineral oil, paraffinic mineral oil, chlorinated naphthenic mineral oil, chlorinated paraffinic mineral oil, and liquid trifluorovinyl chloride polymer, from about 3% to about 20% of finely divided hydrophobic silica suspended in the organic liquid and from about 0.5% to about 5% of a spreading agent, said percentages being based on the composition. Relatively small amounts of this composition have been found to be highly effective in suppressing or controlling foam formation in aqueous systems. The compositions may be utilized as such or in the form of aqueous emulsions.

Having described the invention generally, the following examples are given to illustrate specific embodiments thereof.

EXAMPLE 1

A defoamer was prepared as follows. A colloidal, precipitated silica was sprayed with 15% by weight, based on the weight of silica, of a dimethylpolysiloxane oil, having a viscosity of 50 centistokes. The resulting mixture was heated to 275° C. for one hour. After cooling, 10 parts of the treated silica were added to 85 parts of a naphthenic mineral oil having a Saybolt viscosity of about 80 seconds. The resulting mixture was passed through a Mantin-Gaulin homogenizer at 3000 p.s.i. pressure. To the resulting material 3 parts of commercial stearic acid and 2 parts of triethanolamine were added, and the mixture warmed to 60° C. to dissolve the stearic acid.

EXAMPLE 2

The procedure of Example 1 was followed except that the silica was treated by exposing it to the vapors of dichlorodimethyl silane for one hour, with agitation, instead of using the dimethylpolysiloxane oil.

EXAMPLE 3

The procedure of Example 1 was followed except that the silica used was obtained by displacing the water from a silica hydrogel by adding a low-boiling, water-miscible organic liquid, heating in an autoclave above the critical temperature of the liquid and then venting the autoclave.

EXAMPLE 4

The procedure of Example 1 was followed, except that the silica was obtained by recovering the smoke produced by the burning of silicon tetrachloride.

EXAMPLE 5

The procedure of Example 1 was followed except that a paraffinic oil (commonly known as a "white oil") having a Saybolt viscosity of 85 seconds was used in place of the naphthenic oil.

Defoamer efficiencies of the defoamers of Examples 1–5 were tested as follows. One hundred and fifty (150) ml. of fresh concentrated black liquor obtained from a pulp mill were shaken vigorously at 90° C. in a 500 ml. flask. The foam level at the end of the shaking period was 3 inches. Two hundred parts per million of defoamer was then added and the mixture again shaken for one minute. The foam level at the end of this shaking period in all cases was from about 0 to about 0.2 inch.

EXAMPLES 6–16

Following the procedure of Example 1, a number of defoamers were prepared utilizing various spreading agents and various oils. These were tested for defoamer efficiency in the manner described above. The data is set forth in the following table.

Table

| Example No. | Spreading Agent | Oil | Silica | Defoaming Efficiency, Inches |
|---|---|---|---|---|
| 6 | 3% Sorbitan Trioleate. | 85% Naphthenic Mineral Oil. | 12% Silica | 0.2 |
| 7 | 3% Sorbitan Monostearate. | ----do---------- | ----do------- | 0.2 |
| 8 | 3% Polyoxyethylene Sorbitan Tristearate. | ----do---------- | ----do------- | 1.0 |
| 9 | 5% Sodium Stearate. | ----do---------- | 10% Silica | 0–0.2 |
| 10 | 5% Triethanolamine Stearate. | ----do---------- | ----do------- | 0–0.2 |
| 11 | 3% Morpholinium Ethosulfate. | ----do---------- | 12% Silica | 0.5 |
| 12 | 5% Triethanolamine Stearate. | ----do---------- | 10% Silica | 0–0.2 |
| 13 | 5% Triethanolamine Stearate. | 85% Paraffinic Mineral Oil. | ----do------- | 0–0.2 |
| 14 | ----do---------- | 85% Chlorinated Naphthenic Mineral Oil. | ----do------- | 0–0.2 |
| 15 | ----do---------- | 85% Chlorinated Paraffinic Mineral Oil. | ----do------- | 0–0.2 |
| 16 | ----do---------- | 85% Liquid Trifluoro Vinyl Chloride Polymer. | ----do------- | 0–0.2 |

EXAMPLE 17

Three emulsions were prepared utilizing the following ingredients in the indicated amounts.

| | Emulsion #1 | Emulsion #2 | Emulsion #3 |
|---|---|---|---|
| Defoamer [1] | 36.26 | 36.26 | 36.26 |
| Polyvinyl Alcohol | 0.46 | | |
| Gelatin | | 0.91 | |
| Methyl Cellulose | 0.91 | 0.46 | 1.37 |
| Sorbitan Tristearate | 1.82 | 1.82 | 1.82 |
| Water | 60 | 60 | 60 |

[1] Defoamer prepared following the procedure of Example 1.

In the preparation of these emulsions the polyvinyl alcohol and methyl cellulose (Emulsion #1), the gelatin and methyl cellulose (Emulsion #2) and the methyl cellulose (Emulsion #3) were dissolved in water. The sorbitan tristearate was dissolved in the defoamer by heating to 50° C. and was then cooled to room temperature. The oil phase was added to the water phase and stirred with a Lightning Mixer. This blend was then passed through a Mantin-Gaulin Homogenizer at 500 p.s.i. These emulsions were tested for defoaming efficiencies in the manner described above utilizing 600 p.p.m. of emulsion. In all cases defoaming efficiencies were in the range 0.2–0.5 inch.

An important feature of the present invention is that these novel defoamer compositions may be prepared from a variety of relatively inexpensive, water-insoluble, organic liquids. Organic liquids of this type having low surface tension, i.e., below about 35–40 dynes/cm. are preferred. Exemplary of the organic liquids which may be used herein are mineral hydrocarbons such as naphthenic mineral oils, paraffinic mineral oils, kerosene and similar petroleum fractions including food-grade mineral oil, fluorinated hydrocarbons such as Hooker Chem. Co. "Fluorolube", a liquid trifluoro vinyl chloride polymer, as well as chlorinated organic compounds such as the chloronaphthalenes, i.e., monochloronaphthalene.

The hydrophobic silica contemplated for use herein may be prepared from any of the well-known forms of silica such as (1) silica aerogel, a colloidal silica which may be prepared by displacing the water from a silica hydrogel by a low-boiling, water-miscible, organic liquid, heating in an autoclave or the like above the critical temperature of the liquid, and then venting the autoclave, (2) so-called fume silica, a colloidal silica obtained by burning silicon tetrachloride and collecting the resulting silica smoke and (3) a precipitated silica prepared by the "distabilization of a water-soluble silica under conditions which do not permit the formation of a gel structure, but rather cause the flocculation of silica particles into coherent aggregates such as by the addition of sodium ions to a sodium silicate solution."

Any suitable method may be employed for treating the normally hydrophilic silica to render it hydrophobic. One method which has proved very satisfactory involves spraying the silica with silicone oil, i.e., dimethylpolysiloxane, and heating at elevated temperature, i.e., from about 250° C. to about 350° C., for about ½ to about 2 hours. The amount of silicone oil utilized may vary from about 5% to about 100% by weight based on the weight of the silica. However, amounts from about 7% to about 25% will usually be satisfactory and are preferred.

The finely divided silica may also be rendered hydrophobic by treatment with vapors of an organo-silicon halide or mixture of organo-silicon halides. Examples of organo-silicon halides suitable for this purpose are given in U.S. 2,306,222 and U.S. 2,412,470 and include alkyl(methyl), aryl(phenyl), alkaryl(tolyl) and aralkyl (phenyl methyl) silicon halides. The treatment may be carried out by agitating the finely divided material in a closed container in the presence of vapors of the treating material, i.e., dimethyl dichlorosilane. The amount of treating material and the length of treatment will depend upon the surface area of the inorganic material and the nature of the organo-silicon halide employed. In general, it will be satisfactory to use from about 5% to about 15% by weight of treating agent based on the weight of silica and a time of treatment from about ½ hour to about 2 hours.

Still another method of rendering the silica hydrophobic is by dispersing it in silicone oil, i.e., in a concentration from about 2–10% and heating the dispersion to about 250–300° C. for about an hour more or less. The hydrophobic silica may then be extracted by centrifuging the mixture after dilution with hexane or a similar type of solvent and drying the resulting solid.

The hydrophobic silica utilized in the novel compositions of the invention will desirably have an average particle size less than about 10 microns and preferably less than about 5 microns. Most preferred is an average particle size from about 0.02 micron to about 1 micron.

A spreading agent, i.e., a surfactant, is necessary in the defoamers of the invention to allow the water-insoluble, organic liquid to spread at the air-water interface. Anionic, cationic or non-ionic spreading agents, which will function in this way, are suitable for use herein. The particular type of spreading agent to be utilized is determined to some extent by the type of system in which it is used. In general, the anionics appear to give the best defoaming efficiencies and are preferred. Examples of suitable anionic spreading agents are fatty acids containing from about 12 to about 22 carbon atoms such as stearic and soaps of these fatty acids such as the alkali metal, alkali earth metal, aluminum, ammonium and amine soaps, i.e., triethanolamine stearate, as well as rosin soaps. The soaps may be added as such or formed in situ. Examples of other suitable anionic spreading agents are alkali metal salts of alkyl-aryl sulfonic acids, sodium dialkyl sulfo-succinate, sulfated or sulfonated oils, e.g., sulfated castor oil, sulfonated tallow, and alakli metal salts of short chain petroleum sulfonic acids.

Examples of suitable cationic spreading agents are salts of long chain primary, secondary, or tertiary amines, such as oleylamine acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as morpholinium ethyl sulfate, cetylpyridinium bromide, hexadecyl ethyl morpholinium chloride, and diethyl didodecyl ammonium chloride.

Examples of suitable nonionic spreading agents are condensation products of higher fatty alcohols with ethylene oxide, such as the reaction product of oleyl alcohol with 10 ethylene oxide units; condensation products of alkylphenols with ethylene oxide, such as the reaction product of isooctylphenyl with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate tricosaethyleneglycol dibehenate, ethylene oxide condensation products of polyhydric alcohol partial higher fatty acid esters, and their inner anhydrides (mannitol-anhydride, called Mannitan, and sorbitol-anhydrate, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these emulsifiers may be used; e.g., a cationic may be blended with a nonionic; or an anionic with a nonionic.

The proportions of ingredients in the compositions of the invention may be varied widely. In general, defoaming efficiencies appear to increase with increasing proportions of solids. However, when the proportion of solids is too high, handling difficulties are encountered. Therefore, in order to retain fluidity of the product to allow ease in handling during use, the proportion of solids should not exceed about 20% and preferably about 15% by weight of the composition. It is possible to use as little as 3% of solids although it is preferred to use at least about 10%.

The proportion of water-insoluble organic liquid may vary from about 97% to about 80% of the composition. The preferred range is from about 85% to about 90%.

The amount of spreading agent used will depend on the particular composition and the particular spreading agent. In some cases as little as 0.5% by weight, based on the weight of the composition, may be used. Generally, however, it will be desirable to use at least about 2% of this material. In most cases, not more than about 5% will be required. The preferred range is from about 1% to about 3%.

In preparing the compositions of the invention, finely divided silica is suitably treated to render it hydrophobic. The treated silica is then dispersed in the water-insoluble, organic liquid. The spreading agent may be added at any convenient time prior to, during, or after dispersion of the hydrophobic silica in the liquid. The hydrophobic silica may be dispersed in the liquid by means of usual dispersing equipment such as colloid mills, or homogenizers. A ball mill may also be used. If desired, the particle size of the silica may be reduced to the desired range prior to treatment to render it hydrophobic. This may be accomplished quite effectively by an air mill. Following this the silica may then be treated to render it hydrophobic and dispersed in the liquid in any suitable manner as by a homogenizer.

The compositions of the invention may be utilized as such by merely adding a small amount, i.e., from about 0.003% to about 0.5% to the aqueous system in which control of foaming is desired. Alternatively, these compositions may be converted to aqueous emulsions by adding water and an emulsifying agent and then vigorously agitating, usually by passage through a colloid mill, or homogenizer. Any suitable emulsifying agents such as a mixture of an equal weight percent of sorbitan monostearate and polyoxyethylene sorbitan monostearate, the emulsifier mixtures employed in Example 17 and so on, may be utilized for the purpose. From about 3% to about 10% of the emulsifier based on the oil phase will usually suffice. The amount of water utilized in the preparation of these emulsions may vary from about 40% upward to about 97 to 99%, depending on the desired solids content of the emulsion.

The defoamer compositions of the present invention are highly advantageous because of their low cost and high efficiencies which are equivalent to, and in some cases, surpass those of very expensive prior art defoamers costing many times as much. Moreover, the defoamer compositions of the invention retain their efficiencies in a given system much longer than most other commercial defoamers.

This is a continuation-in-part of my copending application Serial No. 828,051, filed July 20, 1959, now abandoned.

What I claim and desire to protect by Letters Patent is:

1. A defoaming composition consisting essentially of from about 80% to about 97% of a water-insoluble, organic liquid selected from the group consisting of kerosene, naphthenic mineral oil, paraffinic mineral oil, chlorinated naphthenic mineral oil, chlorinated paraffinic mineral oil, and liquid trifluorovinyl chloride polymer, from about 3% to about 20% of hydrophobic silica suspended in the liquid, and from about 0.5% to about 5% of a surfactant for the organic liquid, said percentages being based on the composition.

2. A defoaming composition in accordance with claim 1 in which the water-insoluble, organic liquid is a naphthenic mineral oil.

3. A defoaming composition in accordance with claim 1 in which the water-insoluble, organic liquid is a paraffinic mineral oil.

4. A defoaming composition in accordance with claim 1 in which the water-insoluble, organic liquid is kerosene.

5. A defoaming composition in accordance with claim 1 in which surfactant is selected from the group consisting of fatty acids containing from 12 to 22 carbon atoms, alkali metal, ammonium and amine soaps of fatty acids containing from 12 to 22 carbon atoms and alkali metal, ammonium and amine soaps of rosin.

6. A defoaming composition in accordance with claim 5 in which the surfactant is stearic acid.

7. A defoaming composition in accordance with claim 5 in which the surfactant is triethanolamine stearate.

8. An aqueous defoamer emulsion made up of water and a defoamer composition consisting essentially of from about 80% to about 97% of a water-insoluble, organic liquid selected from the group consisting of kerosene, naphthenic mineral oil, paraffinic mineral oil, chlorinated naphthenic mineral oil, chlorinated paraffinic mineral oil, and liquid trifluorovinyl chloride polymer, from about 3% to about 20% of hydrophobic silica suspended in the liquid, and from about 0.5% to about 5% of a surfactant for the organic liquid, said percentages being based on the composition.

9. The method of preparing a defoaming composition which comprises dispersing hydrophobic colloidal silica in a water-insoluble, organic liquid selected from the group consisting of kerosene, naphthenic mineral oil, paraffinic mineral oil, chlorinated naphthenic mineral oil, chlorinated paraffinic mineral oil, and liquid trifluorovinyl chloride polymer, said water-insoluble organic liquid containing a surfactant, the defoaming composition consisting essentially of from about 80 to about 97% of the organic liquid, from about 3 to about 20% of the hydrophobic colloidal silica and from about 0.5% to about 5% of the surfactant.

References Cited in the file of this patent

UNITED STATES PATENTS

| | | |
|---|---|---|
| 2,306,222 | Patnode | Dec. 22, 1942 |
| 2,412,470 | Norton | Dec. 10, 1946 |
| 2,773,041 | Larsen et al. | Dec. 4, 1956 |
| 2,829,112 | Solomon | Apr. 1, 1958 |
| 2,894,913 | Sullivan et al. | July 14, 1959 |

UNITED STATES PATENT OFFICE
CERTIFICATE OF CORRECTION

Patent No. 3,076,768                 February 5, 1963

Francis J. Boylan

It is hereby certified that error appears in the above numbered patent requiring correction and that the said Letters Patent should read as corrected below.

Column 4, line 32, for "isooctylphenyl" read -- isooctylphenol --.

Signed and sealed this 3rd day of September 1963.

(SEAL)
Attest:

ERNEST W. SWIDER                     DAVID L. LADD
Attesting Officer                     Commissioner of Patents